United States Patent
Yoda et al.

(10) Patent No.: US 10,493,547 B2
(45) Date of Patent: Dec. 3, 2019

(54) WIRE ELECTRICAL DISCHARGE MACHINING DEVICE

(71) Applicant: FANUC CORPORATION, Yamanashi (JP)

(72) Inventors: Shinji Yoda, Yamanashi (JP); Tomoyuki Furuta, Yamanashi (JP); Tomoaki Matsunaga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 301 days.

(21) Appl. No.: 15/488,194

(22) Filed: Apr. 14, 2017

(65) Prior Publication Data

US 2017/0297126 A1    Oct. 19, 2017

(30) Foreign Application Priority Data

Apr. 15, 2016  (JP) .................. 2016-082333

(51) Int. Cl.
  *B23H 1/02*      (2006.01)
  *B23H 7/04*      (2006.01)

(52) U.S. Cl.
  CPC .............. *B23H 1/02* (2013.01); *B23H 1/024* (2013.01); *B23H 7/04* (2013.01); *B23H 1/022* (2013.01)

(58) Field of Classification Search
  CPC .......... B23H 1/02; B23H 1/024; B23H 1/022; B23H 7/00; B23H 7/04; B23H 7/18; B23H 7/20; B23H 7/14
  See application file for complete search history.

(56) References Cited

U.S. PATENT DOCUMENTS

| 6,169,262 B1 | 1/2001 | Lee et al. | |
| 2004/0193306 A1* | 9/2004 | Kurihara | B23H 7/04 700/162 |
| 2008/0110865 A1* | 5/2008 | Hashimoto | B23H 1/022 219/69.12 |
| 2010/0147805 A1 | 6/2010 | Ukai et al. | |
| 2015/0027992 A1* | 1/2015 | Furuta | B23H 7/18 219/69.16 |

FOREIGN PATENT DOCUMENTS

| CN | 1123208 A | 5/1996 |
| CN | 1781639 A | 6/2006 |
| CN | 101121211 A | 2/2008 |
| CN | 101176935 A | 5/2008 |
| CN | 101631638 A | 1/2010 |
| CN | 104339045 A | 2/2015 |

(Continued)

OTHER PUBLICATIONS

Extended European Search Report in EP Application No. 17000636.5, dated Sep. 21, 2017, 8 pp.

*Primary Examiner* — Brian W Jennison
(74) *Attorney, Agent, or Firm* — Hauptman Ham, LLP

(57) ABSTRACT

Whether or not an inter-electrode voltage exceeds a voltage threshold is determined after a predetermined inter-electrode state determination period has passed since application of an induction voltage (inter-electrode voltage) to an inter-electrode gap. Thus, an inter-electrode gap amount between a wire electrode and a work is estimated. A pause time during which electrical discharge is not performed is changed according to an estimation result of the inter-electrode gap amount.

11 Claims, 12 Drawing Sheets

(56) References Cited

FOREIGN PATENT DOCUMENTS

| | | |
|---|---|---|
| EP | 2848349 A1 | 3/2015 |
| JP | 2-212023 A | 8/1990 |
| JP | 4-354621 A | 12/1992 |
| JP | H071238 A | 1/1995 |
| JP | 2002154014 A | 5/2002 |
| JP | 4833197 B2 | 12/2011 |
| JP | 2016196078 A | 11/2016 |
| WO | 2007/032114 A1 | 3/2007 |

* cited by examiner

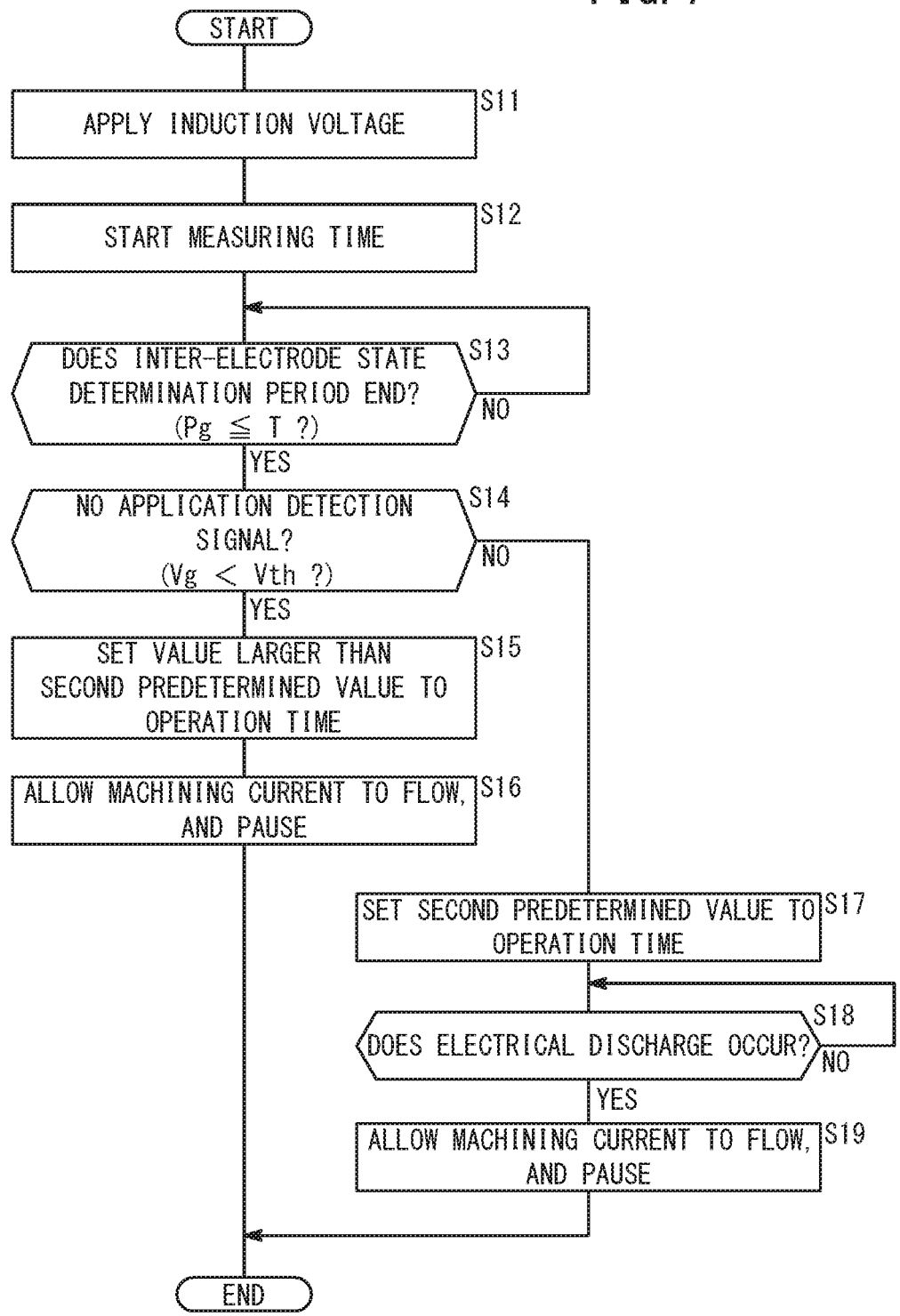

WIRE ELECTRICAL DISCHARGE MACHINING DEVICE

CROSS-REFERENCE TO RELATED APPLICATION

This application is based upon and claims the benefit of priority from Japanese Patent Application No. 2016-082333 filed on Apr. 15, 2016, the contents of which are incorporated herein by reference.

BACKGROUND OF THE INVENTION

Field of the Invention

The present invention relates to a wire electrical discharge machining device that precisely processes a work by using a wire electrode.

Description of the Related Art

Processing performed by using a wire electrical discharge machining device includes a roughing process to cut a processing target or a work as close to an target dimension as possible at a high speed, and a finishing process for increasing precision of a shape dimension of a processed groove after the roughing process.

Japanese Laid-Open Patent Publication No. 04-354621 (hereinafter referred to as "JP04-354621A") discloses a technique of preventing wire break (disconnection) when performing roughing. This technique prevents disconnection by determining whether a gap between a wire and a work is in an adequate normal electrical discharge state or in a short-circuited state or a pseudo inter-electrode short-circuited state that is very much close to the short-circuited state, and extending a pause time in a case other than the normal electrical discharge state.

Japanese Laid-Open Patent Publication No. 02-212023 (hereinafter referred to as "JP02-212023A") and Japanese Patent No. 4833197 disclose techniques of stabilizing processing and further protecting electrodes when performing die-sinking electrical discharge machining by using a wire electrical discharge machining device. These techniques stabilize the processing and further protect the electrodes by extending a pause time or blocking a machining voltage in a case of the short-circuited state or the pseudo inter-electrode short-circuited state that is very close to the short-circuited state.

SUMMARY OF THE INVENTION

Objects of JP04-354621A, JP02-212023A and Japanese Patent No. 4833197 are to protect electrodes during the roughing or the die-sinking electrical discharge machining, but do not take into account efficiency of the finishing performed by the wire electrical discharge machining device.

The present invention has been made by taking into account such a problem, and an object of the present invention is to provide a wire electrical discharge machining device that can efficiently perform finishing.

A first aspect of the present invention is a wire electrical discharge machining device that includes a discharge induction circuit configured to apply an induction voltage to an inter-electrode gap between an electrode and a work and configured to induce electrical discharge, wherein the wire electrical discharge machining device is configured to process the work by repeating a series of cycle including an operation and a pause of the discharge induction circuit, the cycle including an operation of the discharge induction circuit and a subsequent pause time during which the discharge induction circuit is not operated, the wire electrical discharge machining device further including: a voltage application detecting unit configured to output an application detection signal when an inter-electrode voltage exceeds a threshold, after a predetermined inter-electrode state determination period has passed since application of the induction voltage to the inter-electrode gap by the discharge induction circuit; and a control unit configured to change the pause time according to whether or not the voltage application detecting unit outputs the application detection signal.

According to the above configuration, whether or not the inter-electrode voltage exceeds the threshold is determined after the predetermined inter-electrode state determination period has passed since the application of the induction voltage to the inter-electrode gap. Thus, it is possible to estimate the inter-electrode gap amount between a wire electrode and the work. Further, the pause period during which electrical discharge is not performed is changed according to the estimation result of the inter-electrode gap amount, so that it is possible to set an appropriate pause time depending on the inter-electrode gap amount. Consequently, it is possible to efficiently perform finishing and improve precision of the finishing.

A second aspect of the present invention is a wire electrical discharge machining device including: a discharge induction circuit configured to apply an induction voltage to an inter-electrode gap between an electrode and a work and configured to induce electrical discharge; and a main discharge circuit configured to apply a machining voltage to the inter-electrode gap and allow a machining current to flow therein, wherein the wire electrical discharge machining device is configured to process the work by repeating a series of cycle including an operation and a pause of the discharge induction circuit and the main discharge circuit, the cycle including an operation of the discharge induction circuit, a subsequent operation of the main discharge circuit, and a next subsequent pause time during which the discharge induction circuit and the main discharge circuit are not operated, the wire electrical discharge machining device further including: a voltage application detecting unit configured to output an application detection signal when an inter-electrode voltage exceeds a threshold, after a predetermined inter-electrode state determination period has passed since application of the induction voltage to the inter-electrode gap by the discharge induction circuit; and a control unit configured to change the pause time and/or an operation time of the main discharge circuit according to whether or not the voltage application detecting unit outputs the application detection signal.

According to the above configuration, whether or not the inter-electrode voltage exceeds the threshold is determined after the predetermined inter-electrode state determination period has passed since the application of the induction voltage to the inter-electrode gap. Thus, it is possible to estimate the inter-electrode gap amount between a wire electrode and the work. Further, the pause time during which electrical discharge is not performed and/or the operation time of the main discharge circuit are/is changed according to the estimation result of the inter-electrode gap amount. Thus, it is possible to set the appropriate pause time and/or operation time of the main discharge circuit depending on the inter-electrode gap amount. Consequently, it is possible to efficiently perform the finishing and improve the precision of the finishing.

According to the second aspect of the present invention, when the voltage application detecting unit does not output the application detection signal after the inter-electrode state determination period has passed, the control unit may increase the operation time of the main discharge circuit, compared to a case where the voltage application detecting unit outputs the application detection signal at a point of time at which the inter-electrode state determination period has passed.

According to the above configuration, when the voltage application detecting unit does not output the application detection signal after the inter-electrode state determination period has passed, the control unit determines the inter-electrode gap amount as a small (narrow) inter-electrode gap amount, increases the operation time of the main discharge circuit and increases discharge energy. Thus, it is possible to efficiently perform the finishing and improve the precision of the finishing.

According to the first and second aspects of the present invention, when the voltage application detecting unit does not output the application detection signal after the inter-electrode state determination period has passed, the control unit may decrease the pause time, compared to a case where the voltage application detecting unit outputs the application detection signal at a point of time at which the inter-electrode state determination period has ended.

According to the above configuration, when the voltage application detecting unit does not output the application detection signal after the inter-electrode state determination period has passed, the control unit determines the inter-electrode gap amount as a small (narrow) inter-electrode gap amount, decreases the pause time and increases a processing frequency. Thus, it is possible to efficiently perform the finishing and improve the precision of the finishing.

A third aspect of the present invention is a wire electrical discharge machining device that includes a discharge induction circuit configured to apply an induction voltage to an inter-electrode gap between an electrode and a work and configured to induce electrical discharge, wherein the wire electrical discharge machining device is configured to process the work by repeating a series of cycle including an operation and a pause of the discharge induction circuit, the cycle including an operation of the discharge induction circuit and a subsequent predetermined pause time during which the discharge induction circuit is not operated, the wire electrical discharge machining device further including: a discharge delay time measuring unit configured to measure a discharge delay time from application of the induction voltage to the inter-electrode gap by the discharge induction circuit until occurrence of the electrical discharge; and a control unit configured to change the pause time according to the discharge delay time.

The discharge delay time significantly correlates to the inter-electrode gap amount. According to the above configuration, the discharge delay time is measured, so that it is possible to estimate the inter-electrode gap amount between the wire electrode and the work. Further, the pause time during which electrical discharge is not performed is changed according to the estimation result of the inter-electrode gap amount. Thus, it is possible to set the appropriate pause time depending on the inter-electrode gap amount. Consequently, it is possible to efficiently perform the finishing and improve the precision of the finishing.

A fourth aspect of the present invention is a wire electrical discharge machining device including: a discharge induction circuit configured to apply an induction voltage to an inter-electrode gap between an electrode and a work and configured to induce electrical discharge; and a main discharge circuit configured to apply a machining voltage to the inter-electrode gap and allow a machining current to flow therein, wherein the wire electrical discharge machining device is configured to process the work by repeating a series of cycle including an operation and a pause of the discharge induction circuit and the main discharge circuit, the cycle including an operation of the discharge induction circuit, a subsequent operation of the main discharge circuit, and a next subsequent pause time during which the discharge induction circuit and the main discharge circuit are not operated, the wire electrical discharge machining device including: a discharge delay time measuring unit configured to measure a discharge delay time from application of the induction voltage to the inter-electrode gap by the discharge induction circuit until occurrence of the electrical discharge; and a control unit configured to change the pause time and/or an operation time of the main discharge circuit according to the discharge delay time.

The discharge delay time significantly correlates to the inter-electrode gap amount. According to the above configuration, the discharge delay time is measured, so that it is possible to estimate the inter-electrode gap amount between the wire electrode and the work. Further, the pause time during which electrical discharge is not performed and/or the operation time of the main discharge circuit are/is changed according to the estimation result of the inter-electrode gap amount. Thus, it is possible to set the appropriate pause time and/or operation time of the main discharge circuit depending on the inter-electrode gap amount. Consequently, it is possible to efficiently perform the finishing and improve the precision of the finishing.

According to the fourth aspect of the present invention, when the discharge delay time is less than a predetermined value, the control unit may increase the operation time of the main discharge circuit compared to a case where the discharge delay time is the predetermined value or more.

According to the above configuration, when the discharge delay time is less than the predetermined value, the control unit determines the inter-electrode gap amount as a small (narrow) inter-electrode gap amount, increases the operation time of the main discharge circuit and increases discharge energy. Thus, it is possible to efficiently perform the finishing and improve the precision of the finishing.

According to the fourth aspect of the present invention, the control unit may make the operation time of the main discharge circuit longer as the discharge delay time becomes shorter.

According to the above configuration, as the discharge delay time becomes shorter, the inter-electrode gap amount is smaller (narrower), so that the control unit extends the operation time of the main discharge circuit and increases the discharge energy. Consequently, it is possible to efficiently perform the finishing and improve the precision of the finishing.

According to the third and fourth aspects of the present invention, when the discharge delay time is less than a predetermined value, the control unit may decrease the pause time compared to a case where the discharge delay time is the predetermined value or more.

According to the above configuration, when the discharge delay time is less than the predetermined value, the control unit determines the inter-electrode gap amount as a small (narrow) inter-electrode gap amount, decreases the pause time and increases a processing frequency. Thus, it is possible to efficiently perform the finishing and improve the precision of the finishing.

According to the third and fourth aspects of the present invention, the control unit may make the pause time shorter as the discharge delay time becomes shorter.

According to the above configuration, as the discharge delay time becomes shorter, the inter-electrode gap amount is smaller (narrower), so that the control unit shortens the pause time and increases the processing frequency. Consequently, it is possible to efficiently perform the finishing and improve the precision of the finishing.

According to the first to fourth aspects of the present invention, the control unit changes the pause time and/or the operation time of the main discharge circuit when finishing is performed.

According to the present invention, it is possible to efficiently perform the finishing, and improve the precision of the finishing.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a flowchart of a processing pattern 2 according to the first embodiment;

DESCRIPTION OF THE PREFERRED EMBODIMENTS

Preferred embodiments of a wire electrical discharge machining device according to the present invention will be described in detail with reference to the accompanying drawings. In this regard, a wire electrical discharge machining device 10 described below performs finishing after roughing.

1 Configuration of Wire Electrical Discharge Machining Device 10

Figure 1:
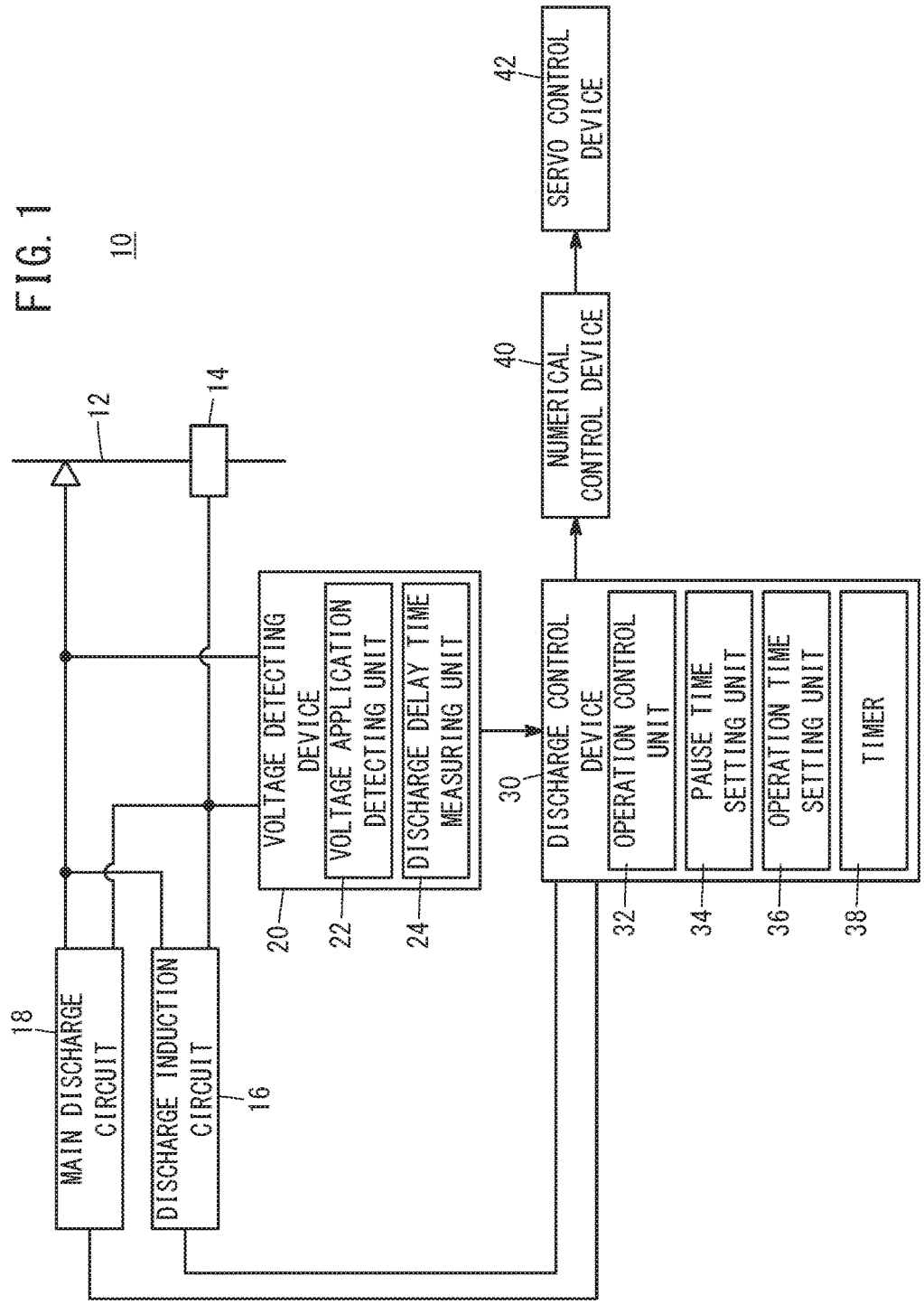
FIG. 1 is a block diagram of a wire electrical discharge machining device according to the present embodiment.

As shown in FIG. 1, the wire electrical discharge machining device 10 mainly includes a wire electrode 12, a discharge induction circuit 16, a main discharge circuit 18, a voltage detecting device 20, a discharge control device 30, a numerical control device 40, and a servo control device 42.

When driven by a motor (not shown) provided to the wire electrical discharge machining device 10, the wire electrode 12 is collected from a bobbin (not shown) to a collection box (not shown) through a work 14. The work 14 is attached to a table (not shown) provided to a main body of the wire electrical discharge machining device 10, and has already been roughly machined or processed. The wire electrode 12 and the work 14 are electrically connected with the discharge induction circuit 16 and the main discharge circuit 18.

The discharge induction circuit 16 is also referred to as an auxiliary discharge circuit, and is a circuit that applies an induction voltage (voltage) between the wire electrode 12 and the work 14 (also referred to as an inter-electrode gap) and induces electrical discharge. The main discharge circuit 18 is a circuit that applies a machining voltage to an inter-electrode gap after the discharge induction circuit 16 induces electrical discharge at the inter-electrode gap, and allows the machining current (discharge current) to flow in the inter-electrode gap. Circuit configurations of the discharge induction circuit 16 and the main discharge circuit 18 will be described below.

The voltage detecting device 20, the discharge control device 30, the numerical control device 40 and the servo control device 42 each include an input/output unit, a storage medium and a calculator including a CPU, and function as the voltage detecting device 20, the discharge control device 30, the numerical control device 40 and the servo control device 42 according to the present embodiment when this CPU reads and executes a program stored in the storage medium (e.g., ROM).

The voltage detecting device 20 includes a voltage application detecting unit 22 and a discharge delay time measuring unit 24. The voltage application detecting unit 22 and the discharge delay time measuring unit 24 will be described with reference to FIGS. 2A and 2B. The voltage application detecting unit 22 includes a voltmeter that detects an inter-electrode voltage.

Figure 2A:
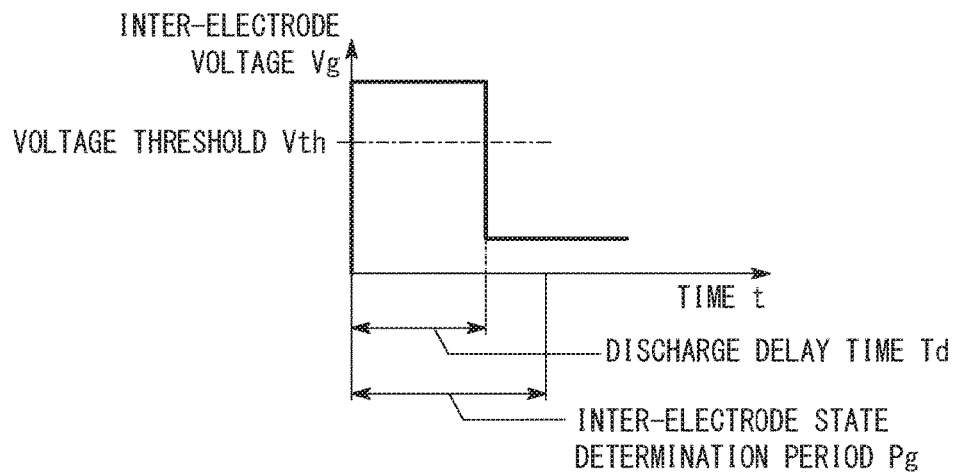
FIG. 2A is a time/inter-electrode voltage characteristic view in a case of a short discharge delay time.
Figure 2B:
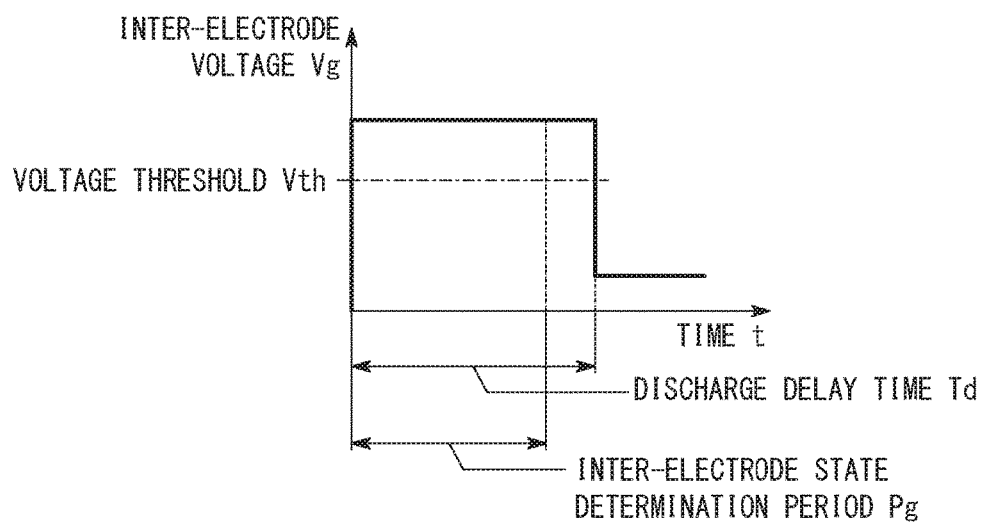
FIG. 2B is a time/inter-electrode voltage characteristic view in a case of a long discharge delay time.

FIGS. 2A and 2B show voltage changes from application of an induction voltage to an inter-electrode gap by the discharge induction circuit 16 until induction of electrical discharge. When an inter-electrode gap amount is narrow, as shown in FIG. 2A, a time that passes from application of an induction voltage to an inter-electrode gap until occurrence of electrical discharge, i.e., a discharge delay time Td, becomes short. In some cases, a time that passes from the application of the induction voltage to the inter-electrode gap until occurrence of electrical discharge and the decrease of an inter-electrode voltage Vg to an arc voltage or less may be referred to as a discharge delay time Td. Meanwhile, when an inter-electrode gap amount is wide, as shown in FIG. 2B, the discharge delay time Td becomes long, which is the time from application of an induction voltage to an inter-electrode gap until occurrence of electrical discharge. This discharge delay time Td has a relationship of a monotonic increase with the inter-electrode gap amount. That is, the discharge delay time Td becomes longer as the inter-electrode gap becomes larger (wider), and a peak value of the inter-electrode voltage Vg becomes higher as the inter-electrode gap amount becomes larger (wider).

Since the application of induction voltage to the inter-electrode gap by the discharge induction circuit 16, i.e., a rise of a value of the inter-electrode voltage Vg from 0 V, after a predetermined inter-electrode state determination period Pg has passed, the voltage application detecting unit 22 determines whether the inter-electrode voltage Vg exceeds a predetermined voltage threshold Vth. Further, when determining that the inter-electrode voltage Vg exceeds the predetermined voltage threshold Vth, the voltage application detecting unit 22 outputs an application detection signal to the discharge control device 30. That is, when the inter-electrode voltage Vg does not exceed the voltage threshold Vth (less than the voltage threshold Vth) at a point of time at which the inter-electrode state determination period Pg has passed as shown in FIG. 2A, the voltage application detecting unit 22 determines the state as a short-circuited discharge state of a small inter-electrode gap amount, and does not output the application detection signal to the discharge control device 30. By contrast with this, when the inter-electrode voltage Vg exceeds the voltage threshold Vth (equal to or more than the voltage threshold Vth) at a point of time at which the inter-electrode state determination period Pg has passed as shown in FIG. 2B, the voltage application detecting unit 22 determines the state as an open state (normal electrical discharge state) of a large inter-electrode gap amount, and outputs the application detection signal to the discharge control device 30.

The discharge delay time measuring unit 24 measures the discharge delay time Td from application of the induction voltage to the inter-electrode gap by the discharge induction circuit 16 until occurrence of the electrical discharge. More specifically, the discharge delay time measuring unit 24 measures an elapsed time from the time that the value of the inter-electrode voltage Vg rises from 0 V until the time that the inter-electrode voltage Vg becomes an arc voltage (=approximately 20 V) or less again. Alternatively, the discharge delay time measuring unit 24 may measure an elapsed time from the time that the value of the inter-electrode voltage Vg exceeds a predetermined threshold until the time that the inter-electrode voltage Vg goes below the threshold. Alternatively, the discharge delay time measuring unit 24 may measure an elapsed time from the time that the value of the inter-electrode voltage Vg exceeds a predetermined threshold A until the time that the inter-electrode voltage Vg goes below a threshold B.

The discharge control device 30 includes an operation control unit 32, a pause time setting unit 34, an operation time setting unit 36 and a timer 38. The operation control unit 32 controls the discharge induction circuit 16 and the main discharge circuit 18 based on settings of the pause time setting unit 34 and the operation time setting unit 36. The pause time setting unit 34 sets a pause time tp during which the discharge induction circuit 16 and the main discharge circuit 18 are not operated. The pause time setting unit 34 changes the pause time tp according to whether or not the voltage application detecting unit 22 sends an application detection signal, or according to the discharge delay time Td measured by the discharge delay time measuring unit 24. The operation time setting unit 36 sets an operation time tm during which the main discharge circuit 18 is operated. The operation time setting unit 36 changes the operation time tm during which the main discharge circuit 18 is operated, according to whether or not the voltage application detecting unit 22 sends the application detection signal, or according to the discharge delay time Td measured by the discharge delay time measuring unit 24.

The numerical control device 40 is configured to output to the servo control device 42 a movement command of a servo motor (not shown) provided to the wire electrical discharge machining device 10 based on the discharge delay time Td. The servo control device 42 is configure to drive the servo motor and perform servo feed control based on the movement command of the servo motor outputted from the numerical control device 40. According to this servo feed control, the wire electrode 12 and the work 14 relatively move. More specifically, the table on which the work 14 is placed is moved.

2 Circuit Configurations of Discharge Induction Circuit 16 and Main Discharge Circuit 18

Figure 3:
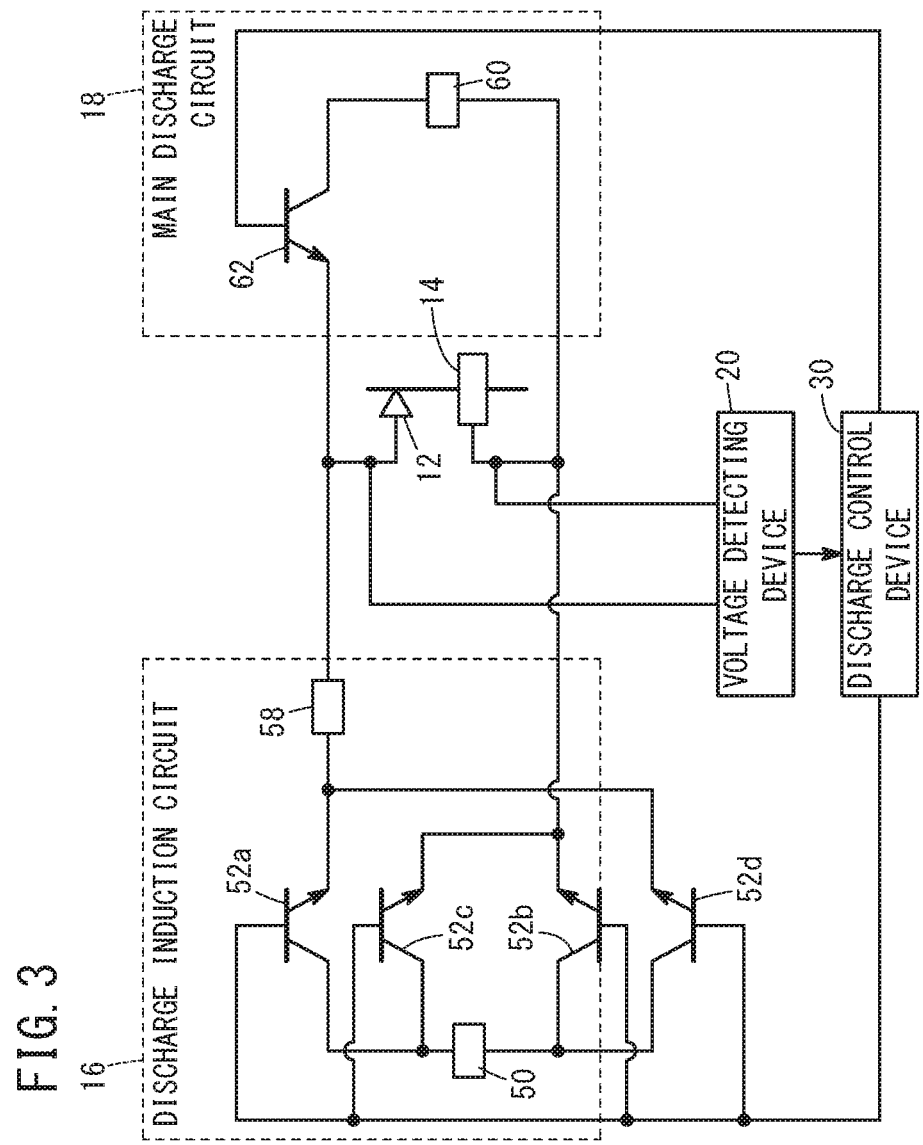
FIG. 3 is a schematic configuration diagram of a main discharge circuit and a discharge induction circuit.

As shown in FIG. 3, the discharge induction circuit 16 includes a discharge induction power supply 50, switching elements 52a to 52d and a current limiting resistor 58. The operation control unit 32 of the discharge control device 30 applies an alternating voltage between the wire electrode 12 and the work 14, by operating alternately a switching element group including the switching element 52a and the switching element 52b, and a switching element group including the switching element 52c and the switching element 52d.

As shown in FIG. 3, the main discharge circuit 18 includes a main discharge power supply 60 and a switching element 62. The operation control unit 32 of the discharge control device 30 applies a voltage between the wire electrode 12 and the work 14 and allows a machining current to flow therein by causing the switching element 62 to operate.

3 Concept of Present Invention

Figure 4A:
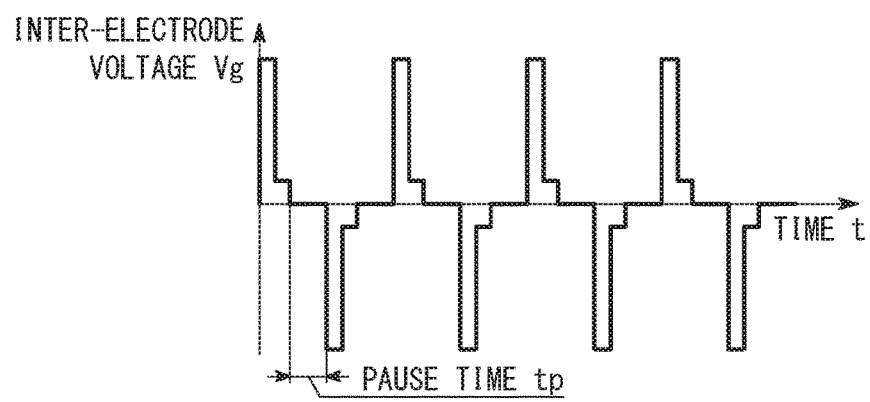
FIGS. 4A and 4B are explanatory diagrams for explaining a concept of the present invention.
Figure 4B:
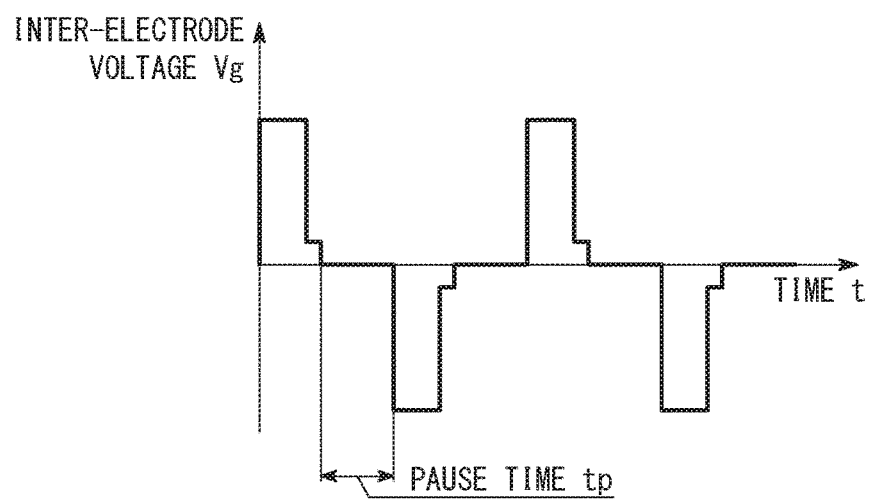

The present invention increases a removal amount by actively increasing a discharge frequency or extending a time to allow a machining current Im to flow, at a portion of a large leftover amount after roughing, i.e., at a portion of a small inter-electrode gap amount. FIG. 4A shows a discharge pattern in a case where a portion of a small inter-electrode gap amount is processed, and FIG. 4B shows a discharge pattern in a case where a portion of a large inter-electrode gap amount is processed. As shown in FIGS. 4A and 4B, the removal amount is increased by decreasing the pause time tp and increasing a processing frequency in a case where the portion of the small inter-electrode gap amount is processed compared to a case where the portion of the large inter-electrode gap amount is processed. In this regard, a discharge pattern for increasing the removal amount by increasing the operation time tm of the main discharge circuit 18 and extending the time to allow the machining current (increasing discharge energy) to flow therein is not shown.

4 Processing Executed in First Embodiment

[4.1 Processing Pattern 1]

Figure 5:
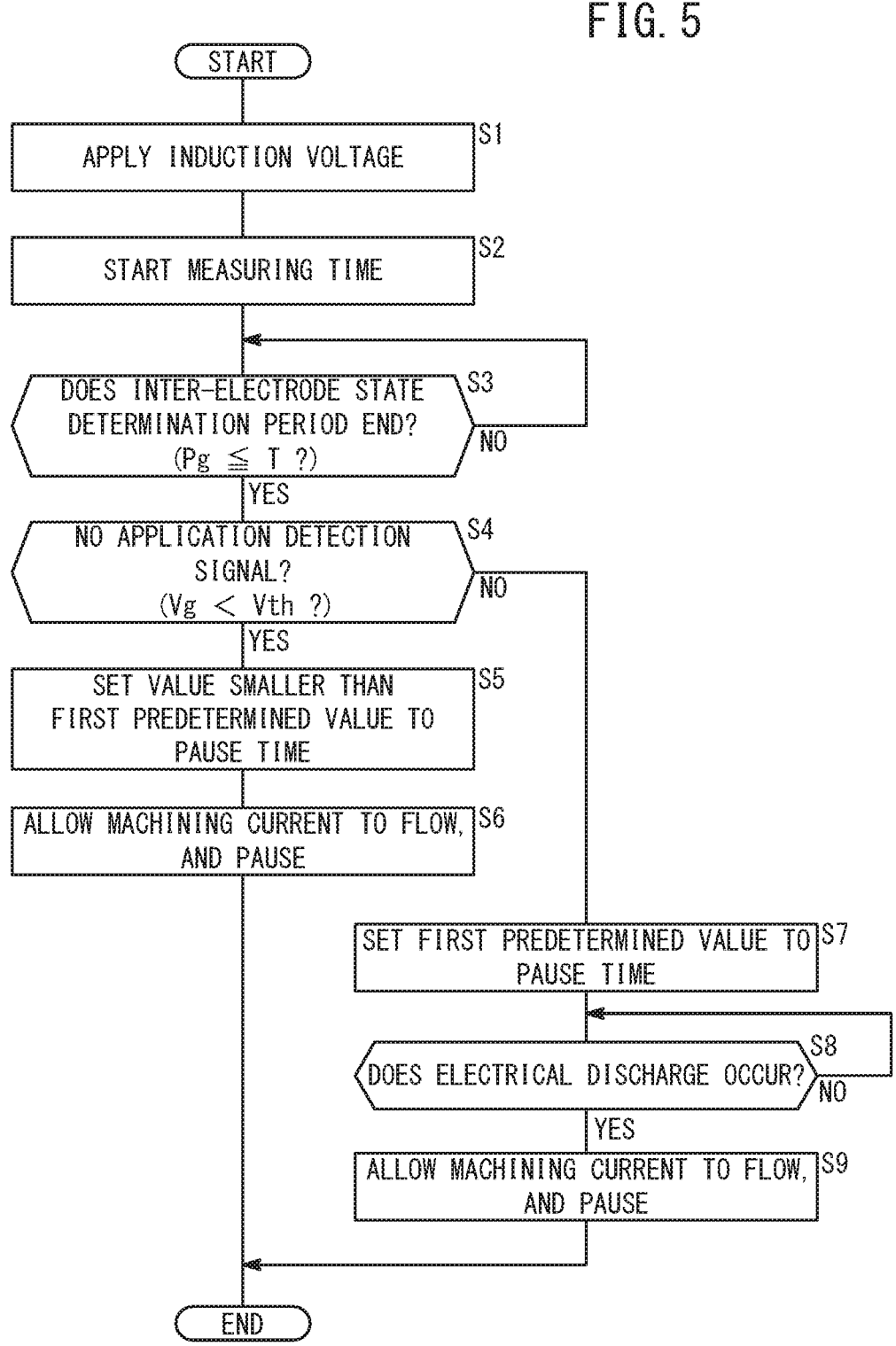
FIG. 5 is a flowchart of a processing pattern 1 according to a first embodiment.
Figure 6A:
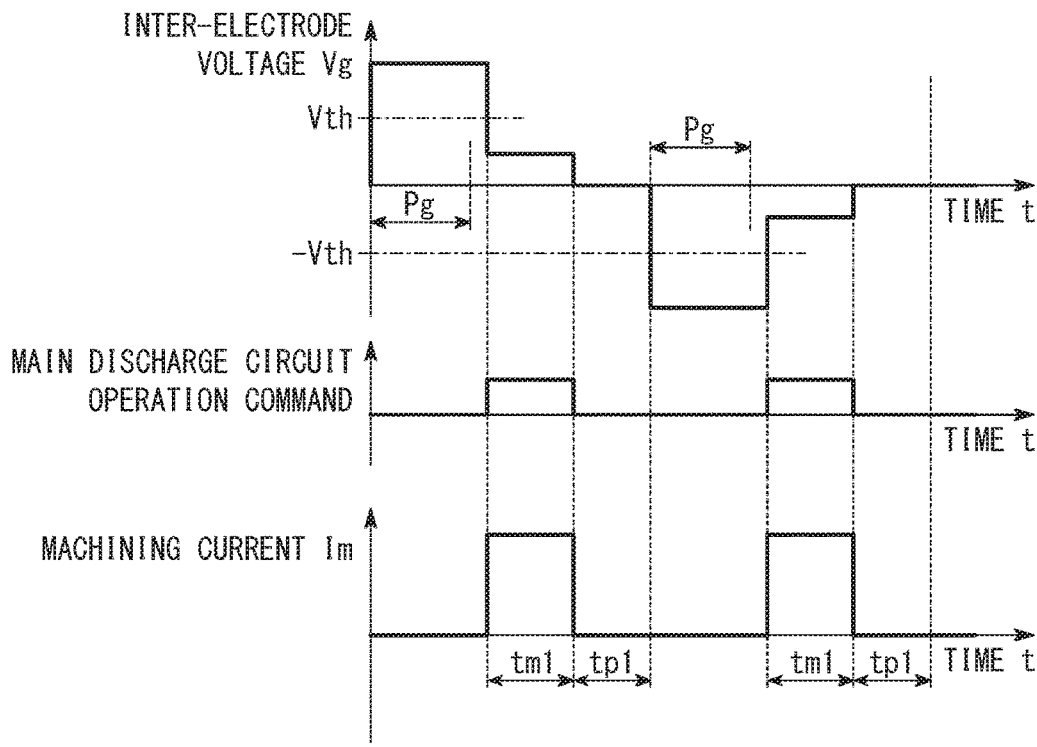
FIG. 6A is a timing chart of an inter-electrode voltage, an operation command of the main discharge circuit, and a machining current in a case of a large inter-electrode gap amount.
Figure 6B:
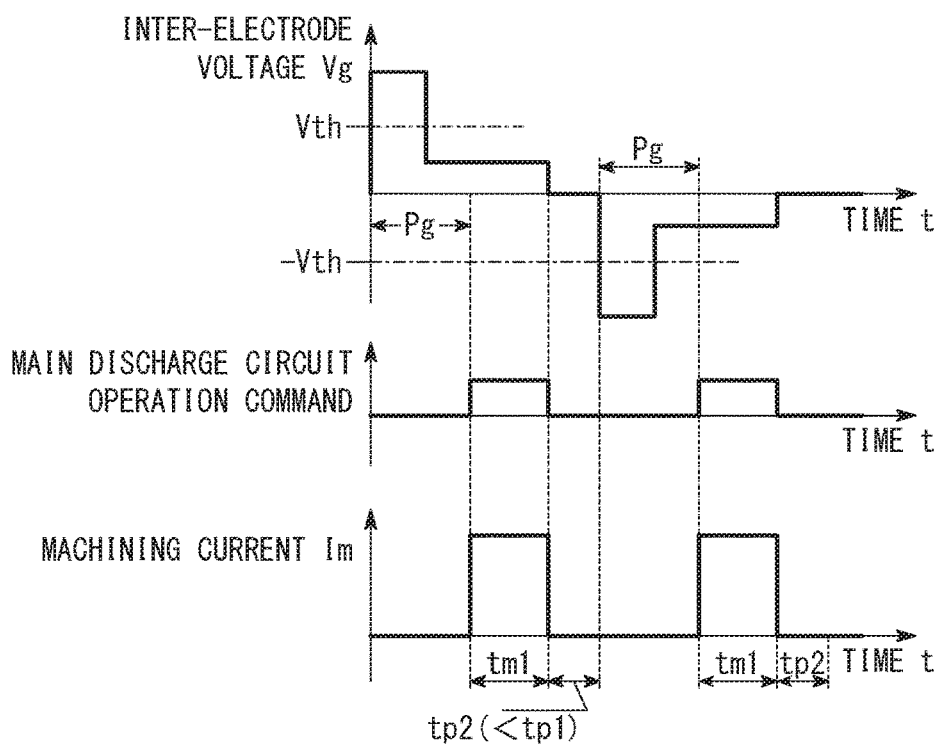
FIG. 6B is a timing chart of an inter-electrode voltage, an operation command of the main discharge circuit, and a machining current in a case of a small inter-electrode gap amount.

FIG. 5 is a flowchart showing an operation (processing pattern 1) of the discharge control device 30 in a case where finishing is performed by determining the pause time tp using the inter-electrode voltage Vg at a point of time at which the preset inter-electrode state determination period Pg has passed. Further, FIGS. 6A and 6B are timing charts showing the inter-electrode voltage Vg, the operation command of the main discharge circuit 18 and the machining current Im when the inter-electrode gap amounts are narrow and wide.

In step S1, the operation control unit 32 of the discharge control device 30 switches one (or the other) switching element group provided to the discharge induction circuit 16 from an off state to an on state to induce electrical discharge at the inter-electrode gap, and applies an induction voltage to the inter-electrode gap. Then, as shown in FIGS. 6A and 6B, the inter-electrode voltage Vg rises.

In step S2, the operation control unit 32 causes the timer 38 to start measuring a lapse time T. In step S3, the operation control unit 32 compares the lapse time T and the preset inter-electrode state determination period Pg. In a case of Pg≤T, the operation control unit 32 determines that the inter-electrode state determination period Pg has ended (step S3: YES), and the processing moves to step S4. Meanwhile, in a case of Pg>T, the operation control unit 32 determines that the inter-electrode state determination period Pg has not ended (step S3: NO), and the operation control unit 32 repeats the processing in step S3.

In step S4, the operation control unit 32 determines whether or not the voltage application detecting unit 22 has sent the application detection signal, at a point of time at which the inter-electrode state determination period Pg has ended. As shown in FIG. 6B, when the inter-electrode gap amount is narrow, the inter-electrode voltage Vg is less than the voltage threshold Vth at the point of time at which the inter-electrode state determination period Pg has ended. Hence, in this case, the voltage application detecting unit 22 does not output the application detection signal even when the inter-electrode state determination period Pg has passed. Thus, when the voltage application detecting unit 22 does not send the application detection signal (step S4: YES), the processing moves to step S5. Meanwhile, as shown in FIG. 6A, when the inter-electrode gap amount is wide, the inter-electrode voltage Vg becomes the voltage threshold Vth or more at the point of time at which the inter-electrode state determination period Pg has ended. Hence, in this case, the voltage application detecting unit 22 outputs the application detection signal when the inter-electrode state determination period Pg has passed. Thus, when the voltage application detecting unit 22 sends the application detection signal (step S4: NO), the processing moves to step S7.

When the processing moves from step S4 to step S5, the pause time setting unit 34 sets a value tp2 (<tp1) smaller than a first predetermined value tp1 to the pause time tp. In this regard, the first predetermined value tp1 is, for example, a preset initial value.

In step S6, as shown in FIG. 6B, after the inter-electrode state determination period Pg, the operation control unit 32 outputs the operation command to the main discharge circuit 18 only for an operation time tm1, applies the machining voltage to the inter-electrode gap, and allows the machining current Im to flow therein. After the operation time tm1 passes, the operation control unit 32 causes the discharge induction circuit 16 and the main discharge circuit 18 to pause only for the pause time tp2 as shown in FIG. 6B. In this regard, when the inter-electrode state determination period Pg has passed, the operation control unit 32 switches one (or the other) switching element group provided to the discharge induction circuit 16 to an off state, and stops applying the induction voltage. Further, this operation time tm1 is a predetermined time.

Meanwhile, when the processing moves from step S4 to step S7, the pause time setting unit 34 sets the first predetermined value tp1 to the pause time tp. In step S8, the operation control unit 32 waits for occurrence of electrical discharge. That is, the operation control unit 32 waits from the time that application of the induction voltage is started, electrical discharge occurs and until the inter-electrode voltage Vg becomes the arc voltage (=approximately 20 V) or less. When electrical discharge occurs and then the inter-electrode voltage Vg becomes the arc voltage (=approximately 20 V) or less (step S8: YES), the processing moves to step S9. Meanwhile, when electrical discharge does not occur and the inter-electrode voltage Vg becomes the arc voltage (=approximately 20 V) or less (step S8: NO), the operation control unit 32 repeats the processing in step S8.

In step S9, as shown in FIG. 6A, after electrical discharge (i.e., after application of the induction voltage is started, then electrical discharge occurs and the inter-electrode voltage Vg becomes the arc voltage (=approximately 20 V) or less), the operation control unit 32 outputs the operation command to the main discharge circuit 18 only for the operation time tm1, applies the machining voltage to the inter-electrode gap and allows the machining current Im to flow therein. After the operation time tm1 passes, the operation control unit 32 causes the discharge induction circuit 16 and the main discharge circuit 18 to pause only for the pause time tp1 as shown in FIG. 6A. In this regard, when electrical discharge is started and the inter-electrode voltage Vg becomes the arc voltage (=approximately 20 V) or less, the operation control unit 32 switches one (or the other) switching element group provided to the discharge induction circuit 16 to the off state, and stops applying the induction voltage. As described above, this operation time tm1 is a predetermined time.

After the pause time tp1 or tp2 passes, the operation control unit 32 performs the processing in step S1 again. As described above, the operation control unit 32 repeats a cycle of processing including an operation and a pause of discharge of the discharge induction circuit 16 and the main discharge circuit 18. The operation control unit 32 of the discharge control device 30 causes one switching element group and the other switching element group provided to the discharge induction circuit 16, to alternately operate so that the polarity of the inter-electrode gap is switched per cycle.

In this regard, according to the processing in steps S5 to S6 among the above processing, the operation control unit 32 waits for main electrical discharge until the inter-electrode state determination period Pg passes after occurrence of electrical discharge due to electrical discharge induction (step S3). However, at the point of time at which the inter-electrode voltage Vg becomes the arc voltage (=approximately 20 V) or less before the inter-electrode state determination period Pg has passed, the operation control unit 32 may output the operation command to the main discharge circuit 18. In this case, for example, the pause time setting unit 34 may detect that electrical discharge has occurred due to electrical discharge induction before the inter-electrode state determination period Pg passes, based on a voltage value detected by the voltage detecting device 20, and may set the value tp2 (<tp1) smaller than the first predetermined value tp1 to the pause time tp.

[4.2 Processing Pattern 2]

According to processing shown in FIG. 5, the pause time tp is changed according to whether or not there is an application detection signal. However, as shown in FIG. 7, the operation time tm of the main discharge circuit 18 can also be changed instead of the pause time tp. Processing in step S11 to step S14 shown in FIG. 7 is the same as the processing in step S1 to step S4 shown in FIG. 5, and therefore will not be described.

When the processing moves from step S14 to step S15, the operation time setting unit 36 sets a value tm2 (>tm1) larger than the second predetermined value tm1 to the operation time tm of the main discharge circuit 18. In this regard, the second predetermined value tm1 is, for example, a preset initial value.

Figure 8A:
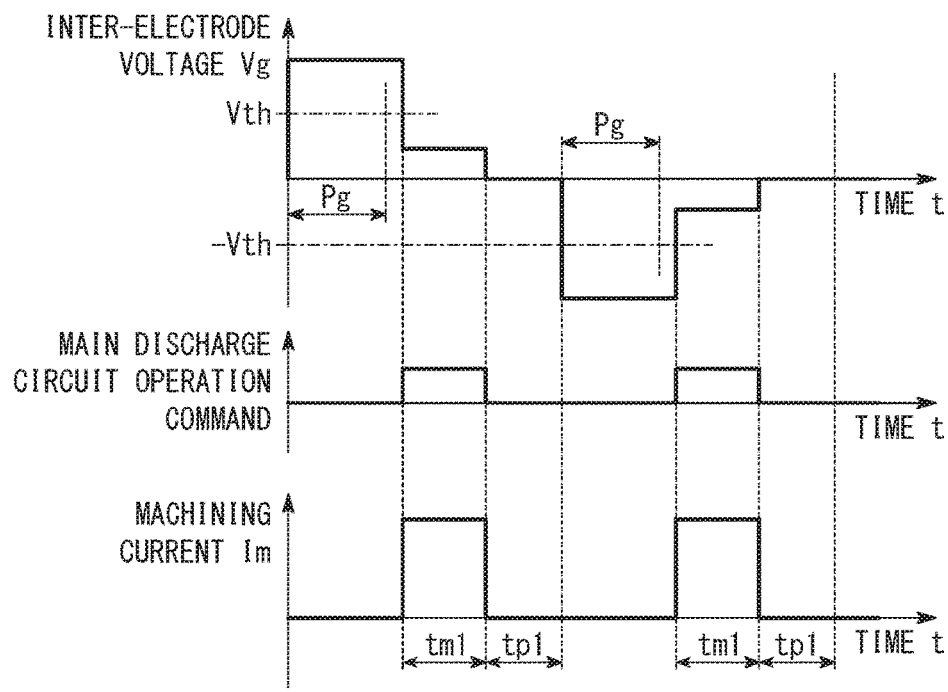
FIG. 8A is a timing chart of an inter-electrode voltage, an operation command of the main discharge circuit, and a machining current in a case of a large inter-electrode gap amount.
Figure 8B:
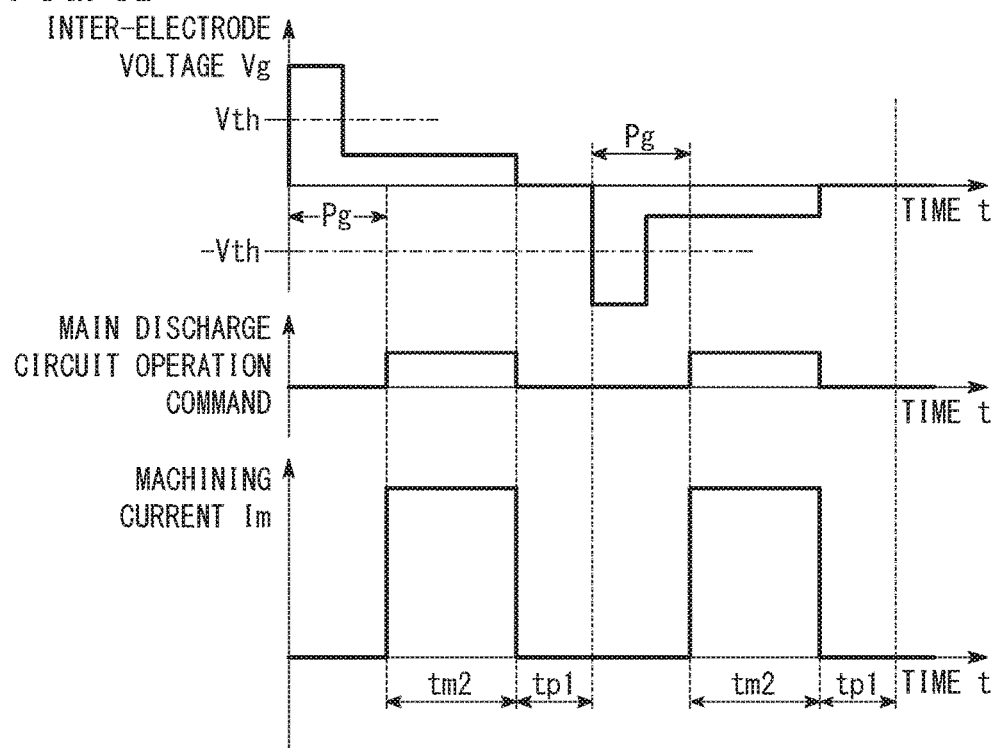
FIG. 8B is a timing chart of an inter-electrode voltage, an operation command of the main discharge circuit, and a machining current in a case of a small inter-electrode gap amount.

In step S16, as shown in FIG. 8B, after the inter-electrode state determination period Pg, the operation control unit 32 outputs the operation command to the main discharge circuit 18 only for the operation time tm2, applies the machining voltage to the inter-electrode gap and allows the machining current Im to flow therein. After the operation time tm2 passes, the operation control unit 32 causes the discharge induction circuit 16 and the main discharge circuit 18 to pause only for the pause time tp1 as shown in FIG. 8B. In this regard, when the inter-electrode state determination period Pg has passed, the operation control unit 32 switches one (or the other) switching element group provided to the discharge induction circuit 16 to the off state, and stops applying the induction voltage. Further, this pause time tp1 is a predetermined time.

Meanwhile, when the processing moves from step S14 to step S17, the operation time setting unit 36 sets the second predetermined value tm1 to the operation time tm of the main discharge circuit 18. In step S18, the operation control unit 32 waits for occurrence of electrical discharge. That is, the operation control unit 32 waits from the time that electrical discharge has started due to the application of the induction voltage, until the time that the inter-electrode voltage Vg becomes the arc voltage (=approximately 20 V) or less. When electrical discharge occurs and the inter-electrode voltage Vg becomes the arc voltage (=approximately 20 V) or less (step S18: YES), the processing moves to step S19. Meanwhile, when electrical discharge does not occur and the inter-electrode voltage Vg does not become the arc voltage (=approximately 20 V) or less (step S18: NO), the operation control unit 32 repeats the processing in step S18.

In step S19, as shown in FIG. 8A, after electrical discharge (i.e., when applying the induction voltage causes occurrence of electrical discharge, and the inter-electrode voltage Vg becomes the arc voltage (=approximately 20 V) or less), the operation control unit 32 outputs the operation command to the main discharge circuit 18 only for the operation time tm1, applies the machining voltage to the inter-electrode gap and allows the machining current Im to flow therein. After the operation time tm1 passes, the operation control unit 32 causes the discharge induction circuit 16 and the main discharge circuit 18 to pause only for the pause time tp1 as shown in FIG. 8A. In this regard, when electrical discharge occurs and the inter-electrode voltage Vg becomes the arc voltage (=approximately 20 V) or less, the operation control unit 32 switches one (or the other) switching element group provided to the discharge induction circuit 16 to the off state, and stops applying the induction voltage. As described above, this pause time tp1 is a predetermined time.

In this regard, according to processing in steps S15 and S16 among the above processing, the operation control unit 32 waits for main electrical discharge until the inter-electrode state determination period Pg passes after occurrence of electrical discharge due to electrical discharge induction (step S13). However, at the point of time at which the inter-electrode voltage Vg becomes the arc voltage (=approximately 20 V) or less before the inter-electrode state determination period Pg has passed, the operation control unit 32 may output the operation command to the main discharge circuit 18. In this case, for example, the pause time setting unit 34 may detect that electrical discharge has occurred due to electrical discharge induction before the inter-electrode state determination period Pg passes, based on the voltage value detected by the voltage detecting device 20, and may set the value tm2 (>tm1) larger than the second predetermined value tm1 to the operation time tm.

[4.3 Processing Pattern 3]

The processing shown in FIG. 5 and the processing shown in FIG. 7 can also be combined. In this case, the processing in step S15 shown in FIG. 7 may be performed before or after the processing in step S5 shown in FIG. 5, and the processing in step S17 shown in FIG. 7 may be performed before or after the processing in step S7 shown in FIG. 5.

[4.4 Processing Pattern 4]

According to the processing patterns 1 and 3, when the voltage application detecting unit 22 sends the application detection signal at the point of time at which the inter-electrode state determination period Pg has ended, the pause time tp is set to tp2 smaller than the first predetermined value tp1, and when the voltage application detecting unit 22 does not send the application detection signal, the pause time tp is set to the first predetermined value tp1. Instead, when the voltage application detecting unit 22 does not send the application detection signal, the pause time tp may be set to the first predetermined value tp1, and when the voltage application detecting unit 22 sends the application detection signal, the pause time tp may be set to tp3 larger than the first predetermined value tp1.

[4.5 Processing Pattern 5]

According to the processing patterns 2 and 3, when the voltage application detecting unit 22 does not send the application detection signal at the point of time at which the inter-electrode state determination period Pg has ended, the operation time tm of the main discharge circuit 18 is set to tm2 larger than the second predetermined value tm1 and, when the voltage application detecting unit 22 outputs the application detection signal, the operation time tm is set to the second predetermined tm1. Instead, when the voltage application detecting unit 22 does not send the application detection signal, the operation time tm may be set to the second predetermined value tm1 and, when the voltage application detecting unit 22 sends the application detection signal, the operation time tm may be set to tm3 smaller than the second predetermined value tm1.

In this case, according to the above processing patterns 1 to 5, when the voltage application detecting unit 22 does not send the application detection signal to the discharge control device 30, i.e., when the inter-electrode gap amount is small (FIGS. 6B and 8B), the main discharge circuit 18 is caused to operate after the inter-electrode state determination period Pg has passed. Instead, at the point of time at which electrical discharge occurs and the inter-electrode voltage Vg becomes the arc voltage (=approximately 20 V) or less, the main discharge circuit 18 may be caused to operate.

According to the processing patterns 1 to 5, in a short-circuited state where the voltage application detecting unit 22 sends the application detection signal, the pause time tp for removing a sludge and cooling the wire electrode 12 after electrical discharge ends, is changed. Meanwhile, when the voltage application detecting unit 22 does not send the application detection signal to the discharge control device 30, applying the induction voltage is continued, and occurrence of electrical discharge is waited for a predetermined period. Electrical discharge detected after the inter-electrode state determination period Pg, is regarded as normal electrical discharge, and the pause time tp of the normal electrical discharge is a first predetermined value determined in advance based on processing conditions etc. Consequently, it is possible to flexibly change the pause time tp in the short-circuited discharge state from the pause time tp in the normal electrical discharge.

5. Conclusion of First Embodiment

The wire electrical discharge machining device 10 includes the discharge induction circuit 16 that applies an induction voltage to the inter-electrode gap that is between the wire electrode 12 and the work 14 (processing target) and induces electrical discharge, and the main discharge circuit 18 that applies the machining voltage to the inter-electrode gap and allows the machining current to flow therein. The wire electrical discharge machining device 10 processes the work 14 by repeating a series of cycle including an operation and a pause of the discharge induction circuit 16 and the main discharge circuit 18. The cycle includes an operation of the discharge induction circuit 16, and a subsequent operation of the main discharge circuit 18, and the next subsequent pause time tp during which the discharge induction circuit 16 and the main discharge circuit 18 are not operated. The wire electrical discharge machining device 10 further includes the voltage application detecting unit 22 that outputs the application detection signal when the inter-electrode voltage Vg exceeds the voltage threshold Vth, after the predetermined inter-electrode state determination period Pg has passed since the application of the induction voltage to the inter-electrode gap by the discharge induction circuit 16, and the discharge control device 30 (control unit) that changes the pause time tp and/or the operation time tm of the main discharge circuit 18 according to whether or not the voltage application detecting unit 22 outputs the application detection signal.

According to the above configuration, after the predetermined inter-electrode state determination period Pg has passed since the application of the induction voltage to the inter-electrode gap, whether or not the inter-electrode voltage Vg exceeds the voltage threshold Vth is determined. Therefore, it is possible to estimate the inter-electrode gap amount between the wire electrode 12 and the work 14. Further, the pause time tp during which electrical discharge is not performed and/or the operation time tm of the main discharge circuit 18, are/is changed according to an estimation result of the inter-electrode gap amount. Therefore, it is possible to set the appropriate pause time tp and/or the operation time tm of the main discharge circuit 18 depending on the inter-electrode gap amount. Consequently, it is possible to efficiently perform finishing and improve precision of the finishing.

When the voltage application detecting unit 22 does not output the application detection signal after the inter-electrode state determination period Pg has passed, the discharge control device 30 increases the operation time tm of the main discharge circuit 18 compared to a case where the voltage application detecting unit 22 outputs the application detection signal at the point of time at which the inter-electrode state determination period Pg has passed.

According to the above configuration, when the voltage application detecting unit 22 does not output the application detection signal after the inter-electrode state determination period Pg has passed, the discharge control device 30 determines the inter-electrode gap amount as a small (narrow) inter-electrode gap amount, increases the operation time tm of the main discharge circuit 18, and increases discharge energy. Thus, it is possible to efficiently perform finishing and improve precision of the finishing.

When the voltage application detecting unit 22 does not output the application detection signal after the inter-electrode state determination period Pg has passed, the discharge control device 30 decreases the pause time tp compared to a case where the voltage application detecting unit 22 outputs the application detection signal at the point of time at which the inter-electrode state determination period Pg has ended.

According to the above configuration, when the voltage application detecting unit 22 does not output the application detection signal after the inter-electrode state determination period Pg has passed, the discharge control device 30 determines the inter-electrode gap amount as a small (narrow) inter-electrode gap amount, decreases the pause time tp and increases the processing frequency. Thus, it is possible to efficiently perform finishing and improve precision of the finishing.

In a case of wire electrical discharge machining, when electrical discharge starts at an inter-electrode gap, electrical discharge occurs near a first discharge point for a while. In this regard, this period is referred to as a group discharge period. It is estimated that the wire electrode 12 vibrates due to vibrations of a dielectric liquid (processing liquid), electrostatic suction forces, discharge repulsive forces, etc. and that this phenomenon (occurrence of electrical discharge near a first discharge point) depends on the vibration cycle. These vibrations are assumed to be constant irrespectively of a position of the wire electrode 12 in a thickness direction of the work 14. When electrical discharge occurs at a portion of a large removal amount of the work 14, electrical discharge collectively occurs near this portion for a while, so that it is possible to efficiently improve processing precision by performing control to decrease the pause time tp and increase the number of times of electrical discharge in the group discharge period.

In a case of conventional electrical discharge machining, leftovers of the work 14 are removed by lowering a relative speed of the wire electrode 12 and the work 14 at a portion of a large leftover amount of the work 14. In contrast, in the wire electrical discharge machining device 10 according to the present embodiment, it is possible to increase the number of times of electrical discharge per time by decreasing the pause time tp at a portion of a large leftover amount of the work 14. Alternatively, it is possible to increase the removal amount per main electrical discharge by extending the operation time tm of the main discharge circuit 18 at a portion of a large leftover amount of the work 14. Consequently, it is possible to prevent the processing speed from lowering compared to the conventional wire electrical discharge machining.

The inventors of the present invention conducted a processing experiment by using the present embodiment, and found that it was possible to realize both of improvement of processing precision and improvement of a processing speed. Shape precision was improved from 12 μm to 8 μm by performing finishing on a tool steel whose thickness was 60 mm. Further, when the shape precision was the same, it was possible to improve the processing speed by 15%. Thus, it was found that it was possible to improve the processing precision and the processing speed according to the present embodiment.

6 Processing Executed in Second Embodiment

[6.1 Processing Pattern 1]

Figure 9:
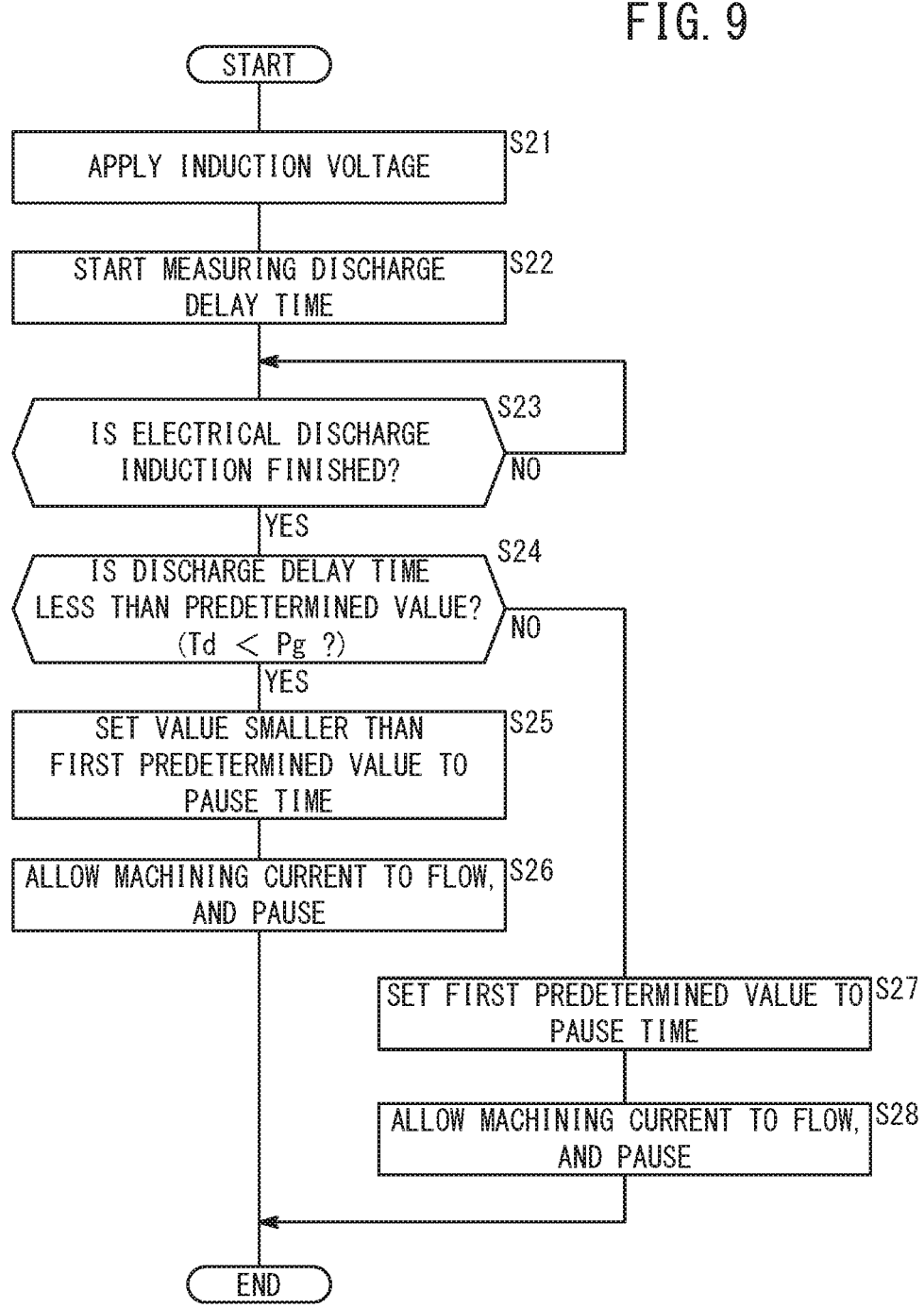
FIG. 9 is a flowchart of a processing pattern 1 according to a second embodiment.
Figure 10A:
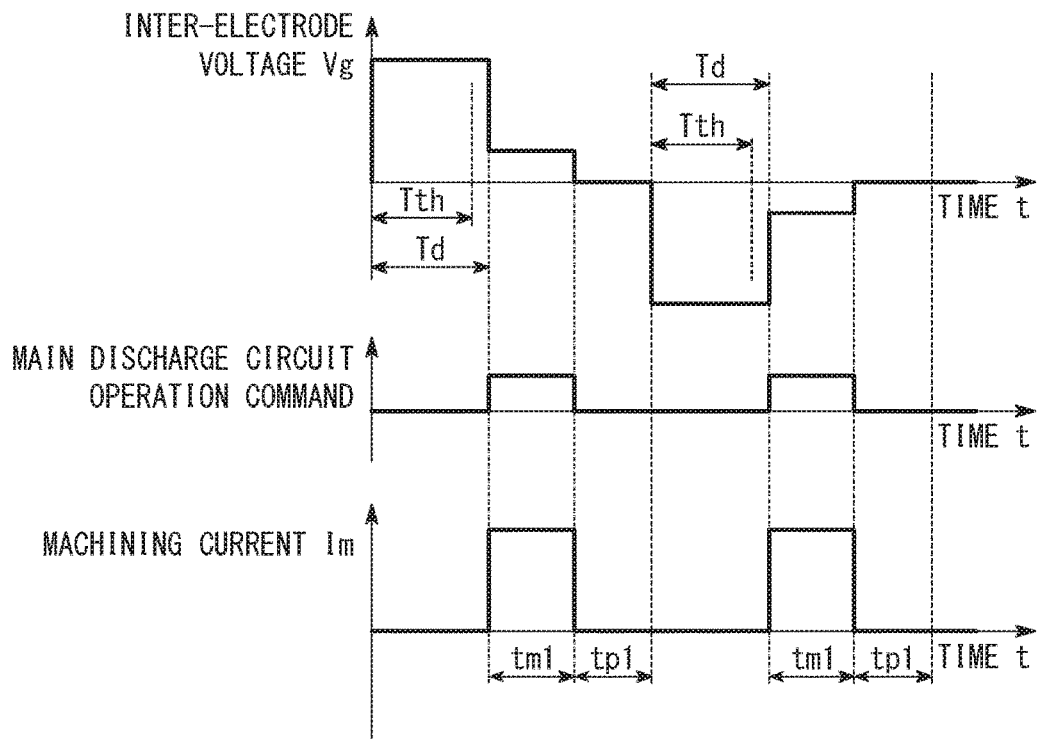
FIG. 10A is a timing chart of an inter-electrode voltage, an operation command of the main discharge circuit, and a machining current in a case of a large inter-electrode gap amount.
Figure 10B:
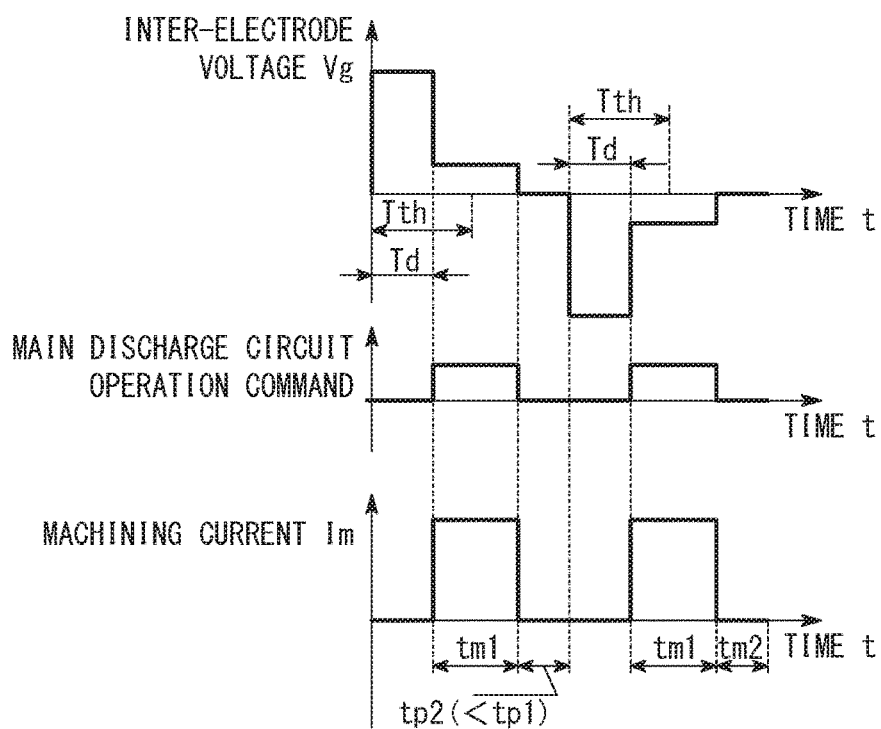
FIG. 10B is a timing chart of an inter-electrode voltage, an operation command of the main discharge circuit, and a machining current in a case of a small inter-electrode gap amount.

FIG. 9 is a flowchart showing an operation (processing pattern 1) of the discharge control device 30 of performing finishing by determining the pause time tp using the discharge delay time Td. Further, FIGS. 10A and 10B are timing charts showing the inter-electrode voltage Vg, the operation command of the main discharge circuit 18 and the machining current Im when the inter-electrode gap amounts are wide and narrow, respectively.

In step S21, the operation control unit 32 of the discharge control device 30 switches one (or the other) switching element group provided to the discharge induction circuit 16 from the off state to the on state, and applies an induction voltage to an inter-electrode gap to induce electrical discharge at the inter-electrode gap. Then, as shown in FIGS. 10A and 10B, the inter-electrode voltage Vg rises.

In step S22, the discharge delay time measuring unit 24 starts measuring the discharge delay time Td. In step S23, the discharge delay time measuring unit 24 determines whether or not electrical discharge induction has been finished by detecting that the inter-electrode voltage Vg goes down to the arc voltage (=approximately 20 V) or less from a peak value, and specifies the discharge delay time Td. In a case where the induction discharge has been finished (step S23: YES), the processing moves to step S24. Meanwhile, in a case where the induction discharge has not been finished (step S23: NO), the operation control unit 32 repeats the processing in step S23.

In step S24, the operation control unit 32 determines whether or not the discharge delay time Td is less than a predetermined time Tth. When the discharge delay time Td is less than the predetermined time Tth as shown in FIG. 10B (step S24: YES), the processing moves to step S25. Meanwhile, when the discharge delay time Td is the predetermined time Tth or more as shown in FIG. 10A (step S24: NO), the processing moves to step S27.

When the processing moves from step S24 to step S25, the pause time setting unit 34 sets the value tp2 (<tp1) smaller than the first predetermined value tp1 to the pause time tp. In this regard, the first predetermined value tp1 is, for example, a preset initial value.

In step S26, as shown in FIG. 10B, after the inter-electrode voltage Vg becomes the arc voltage (=approximately 20 V) or less (after discharge delay time Td), the operation control unit 32 outputs the operation command to the main discharge circuit 18 only for the operation time tm1, applies the machining voltage to the inter-electrode gap and allows the machining current Im to flow therein. After the operation time tm1 passes, the operation control unit 32 causes the discharge induction circuit 16 and the main discharge circuit 18 to pause only for the pause time tp2 as shown in FIG. 10B. In this regard, after the discharge delay time Td has passed, the operation control unit 32 switches one (or the other) switching element group provided to the discharge induction circuit 16 to the off state, and stops applying the induction voltage. Further, this operation time tm1 is a predetermined time.

Meanwhile, when the processing moves from step S24 to step S27, the pause time setting unit 34 sets the first predetermined value tp1 to the pause time tp.

In step S28, as shown in FIG. 10A, after the inter-electrode voltage Vg becomes the arc voltage (=approximately 20 V) or less (after the discharge delay time Td), the operation control unit 32 outputs the operation command to the main discharge circuit 18 only for the operation time tm1, applies the machining voltage to the inter-electrode gap, and allows the machining current Im to flow therein. After the operation time tm1 passes, the operation control unit 32 causes the discharge induction circuit 16 and the main discharge circuit 18 to pause only for the pause time tp1 as shown in FIG. 10A. In this regard, when the discharge delay time Td has passed, the operation control unit 32 switches one (or the other) switching element group provided to the discharge induction circuit 16 to the off state, and stops applying the induction voltage. As described above, this operation time tm1 is a predetermined time.

After the pause time tp1 or tp2 passes, the operation control unit 32 performs the processing in step S21 again. As described above, the operation control unit 32 repeats a cycle of processing including an operation and a pause of discharge of the discharge induction circuit 16 and the main discharge circuit 18. The operation control unit 32 of the discharge control device 30 causes one switching element group and the other switching element group provided to the discharge induction circuit 16 to alternately operate to switch the polarity of the inter-electrode gap per cycle.

[6.2 Processing Pattern 2]

Figure 11:
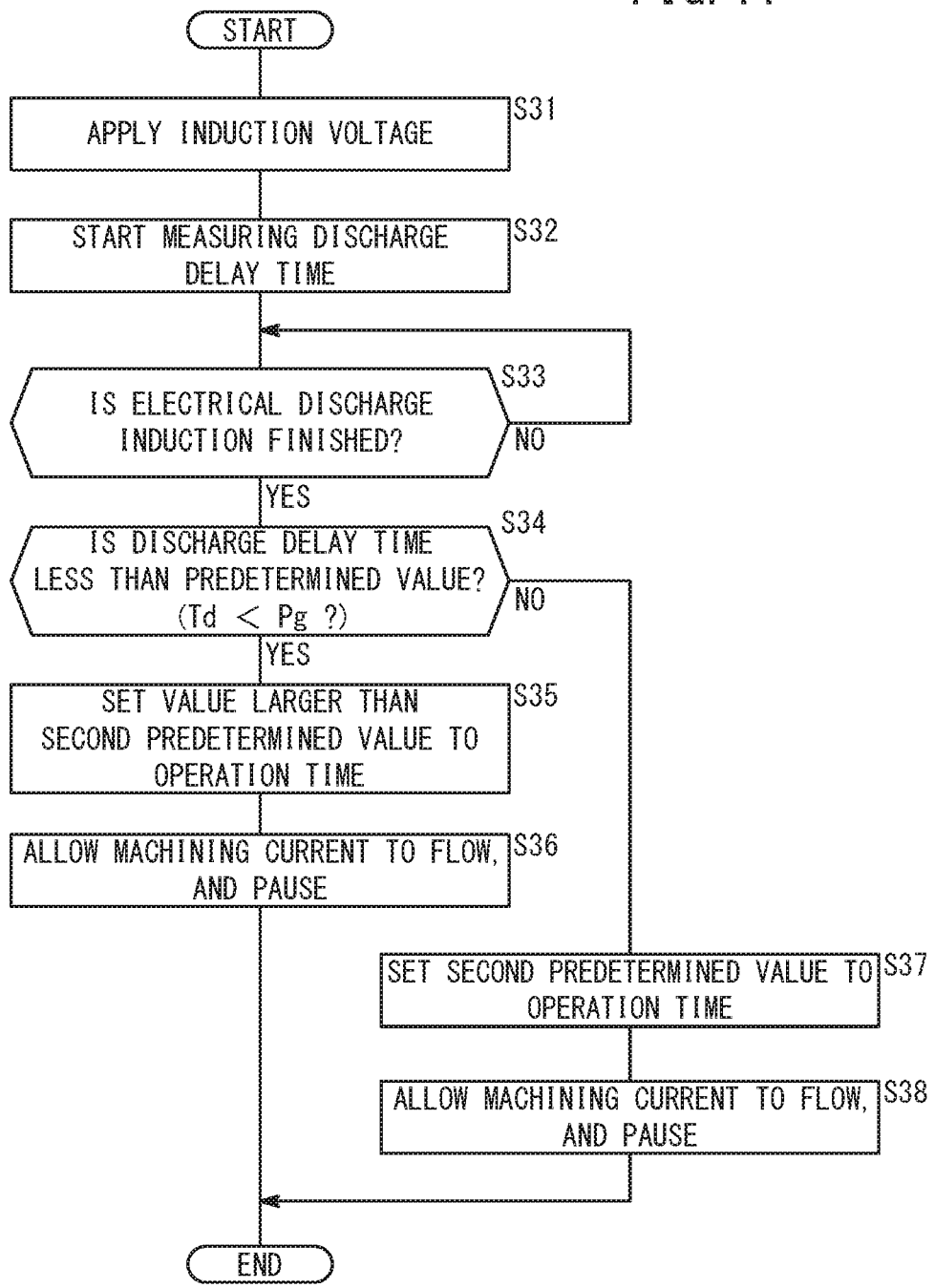
FIG. 11 is a flowchart of a processing pattern 2 according to the second embodiment.

According to processing shown in FIG. 9, the pause time tp is changed according to whether or not the discharge delay time Td is in the predetermined time Tth. However, as shown in FIG. 11, it is also possible to change the operation time tm of the main discharge circuit 18 instead of the pause time tp. Processing in step S31 to step S34 shown in FIG. 11 is the same as the processing in step S21 to step S24 shown in FIG. 9, and therefore will not be described.

When the processing moves from step S34 to step S35, the operation time setting unit 36 sets the value tm2 (>tm1) larger than the second predetermined value tm1 to the operation time tm of the main discharge circuit 18. In this regard, the second predetermined value tm1 is, for example, a preset initial value.

Figure 12A:
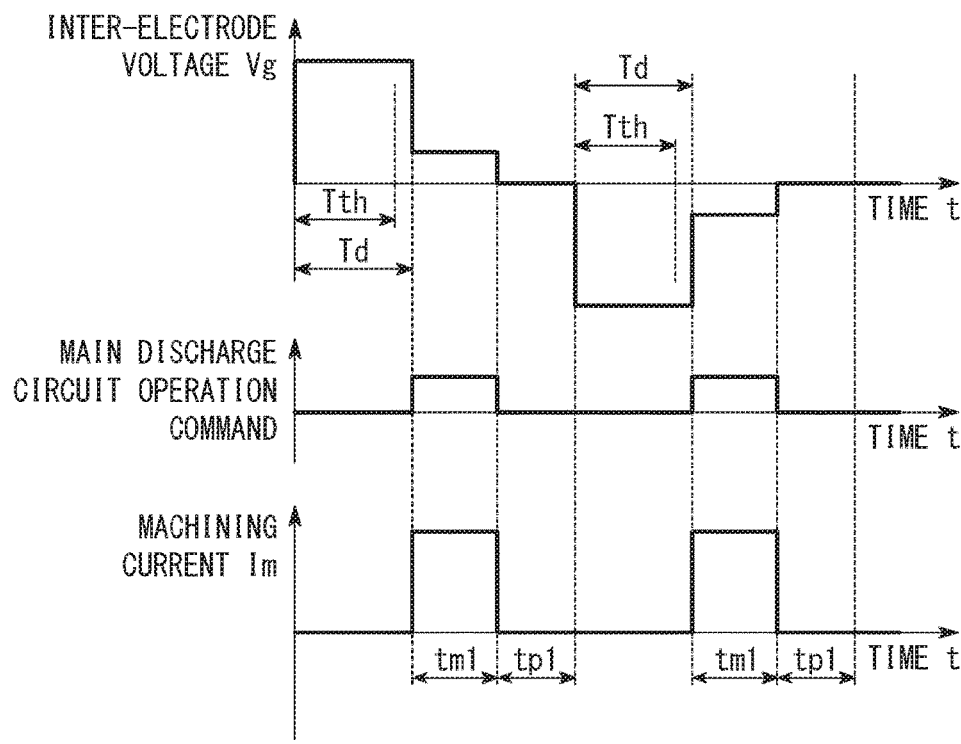
FIG. 12A is a timing chart of an inter-electrode voltage, an operation command of the main discharge circuit, and a machining current in a case of a large inter-electrode gap amount.
Figure 12B:
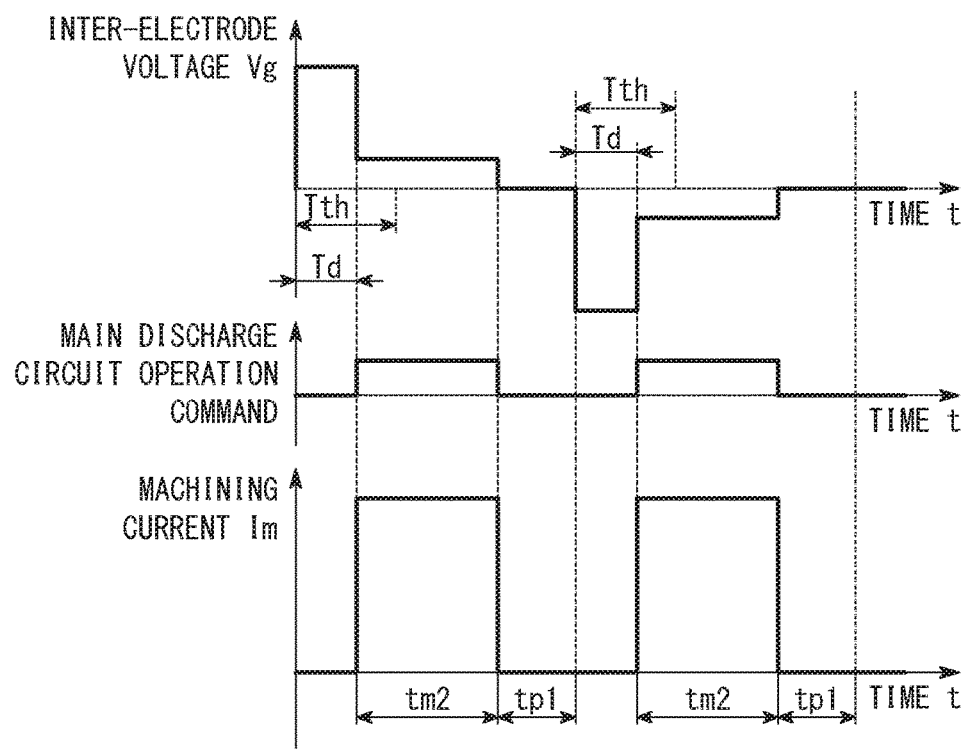
FIG. 12B is a timing chart of an inter-electrode voltage, an operation command of the main discharge circuit, and a machining current in a case of a small inter-electrode gap amount.

In step S36, as shown in FIG. 12B, after the inter-electrode voltage Vg becomes the arc voltage (=approximately 20 V) or less (after the discharge delay time Td), the operation control unit 32 outputs the operation command to the main discharge circuit 18 only for the operation time tm2, applies the machining voltage to the inter-electrode gap and allows the machining current Im to flow therein. After the operation time tm2 passes, the operation control unit 32 causes the discharge induction circuit 16 and the main discharge circuit 18 to pause only for the pause time tp1 as shown in FIG. 12B. In this regard, when the discharge delay time Td has passed, the operation control unit 32 switches one (or the other) switching element group provided to the discharge induction circuit 16 to the off state, and stops applying an induction voltage. Further, this pause time tp1 is a predetermined time.

Meanwhile, when the processing moves from step S34 to step S37, the operation time setting unit 36 sets the second predetermined value tm1 to the operation time tm of the main discharge circuit 18.

In step S38, as shown in FIG. 12A, after the inter-electrode voltage Vg becomes the arc voltage (=approximately 20 V) or less (after the discharge delay time Td), the operation control unit 32 outputs the operation command to the main discharge circuit 18 only for the operation time tm1, applies the machining voltage to the inter-electrode gap and allows the machining current Im to flow therein. After the operation time tm1 passes, the operation control unit 32 causes the discharge induction circuit 16 and the main discharge circuit 18 to pause only for the pause time tp1 as shown in FIG. 12A. In this regard, after the discharge delay time Td has passed, the operation control unit 32 switches one (or the other) switching element group provided to the discharge induction circuit 16 to the off state, and stops applying the induction voltage. As described above, this pause time tp1 is a predetermined time.

[6.3 Processing Pattern 3]

The processing shown in FIG. 9 and the processing shown in FIG. 11 can also be combined. In this case, the processing in step S35 shown in FIG. 11 may be performed before or after the processing in step S25 shown in FIG. 9, and the processing in step S37 shown in FIG. 11 may be performed before or after the processing in step S27 shown in FIG. 9.

[6.4 Processing Pattern 4]

According to the processing patterns 1 and 3, when the discharge delay time Td is less than the predetermined time Tth, the pause time tp is set to tp2 smaller than the first predetermined value tp1 and, when the discharge delay time Td is the predetermined time Tth or more, the pause time tp is set to the first predetermined value tp1. Instead, when the discharge delay time Td is less than the predetermined time Tth, the pause time tp may be set to the first predetermined value tp1 and, when the discharge delay time Td is the predetermined time Tth or more, the pause time tp may be set to tp3 larger than the first predetermined value tp1.

[6.5 Processing Pattern 5]

According to the processing patterns 2 and 3, when the discharge delay time Td is less than the predetermined time Tth, the operation time tm of the main discharge circuit 18 is set to tm2 larger than the second predetermined value tm1 and, when the discharge delay time Td is the predetermined time Tth or more, the operation time tm is set to the second predetermined value tm1. Instead, when the discharge delay time Td is less than the predetermined time Tth, the operation time tm may be set to the second predetermined value tm1 and, when the discharge delay time Td is the predetermined time Tth or more, the operation time tm may be set to tm3 smaller than the second predetermined value tm1.

7 Modification of Second Embodiment

In the second embodiment, the discharge delay time Td and the predetermined time Tth are compared, and the pause time Tp and/or the operation time tm of the main discharge circuit 18, are/is set. However, the pause time tp and/or the operation time tm of the main discharge circuit 18 may be set according to a duration of the discharge delay time Td without comparing the discharge delay time Td and the predetermined time Tth. In this case, a relationship that makes the pause time tp shorter as the discharge delay time Td becomes shorter is stored as a map, and this map is used. Further, another relationship that makes the operation time tm of the main discharge circuit 18 longer as the discharge delay time Td becomes shorter is stored as a map, and this map is used.

8 Conclusion of Second Embodiment

In the first embodiment, the pause time tp and/or the operation time tm of the main discharge circuit 18, are/is set according to a magnitude of the inter-electrode voltage Vg after the inter-electrode state determination period Pg. However, in the second embodiment, the pause time tp and/or the operation time tm of the main discharge circuit 18, are/is set according to a duration of the discharge delay time Td. For the following reason, it is possible to more accurately estimate the inter-electrode gap amount in the second embodiment compared to the first embodiment.

For example, during the inter-electrode state determination period Pg, when electrical discharge occurs and then insulation is recovered at the inter-electrode gap, the voltage rises again. Consequently, when the inter-electrode voltage Vg becomes the voltage threshold Vth or more after the inter-electrode state determination period Pg has ended, electrical discharge is determined as normal electrical discharge, and the predetermined pause time tp that is not shortened is employed. Meanwhile, it is possible to accurately estimate the inter-electrode gap amount by using the discharge delay time Td.

The wire electrical discharge machining device 10 includes the discharge induction circuit 16 that applies an induction voltage to an inter-electrode gap that is between the wire electrode 12 and the work 14 (processing target) and induces electrical discharge, and the main discharge circuit 18 that applies the machining voltage to the inter-electrode gap and allows the machining current to flow therein. The wire electrical discharge machining device 10 processes the work 14 by repeating a series of cycle including an operation and a pause of the discharge induction circuit 16 and the main discharge circuit 18. The cycle includes the operation of the discharge induction circuit 16, the subsequent operation of the main discharge circuit 18, and the next subsequent pause time tp during which the discharge induction circuit 16 and the main discharge circuit 18 are not operated. The wire electrical discharge machining device 10 includes the discharge delay time measuring unit 24 that measures the discharge delay time Td from application of the induction voltage to the inter-electrode gap by the discharge induction circuit 16 until occurrence of electrical discharge, and the discharge control device 30 (control unit) that changes the pause time tp and/or the operation time tm of the main discharge circuit 18 according to the discharge delay time Td.

The discharge delay time Td significantly correlates to the inter-electrode gap amount. According to the above configuration, the discharge delay time Td is measured, so that it is possible to estimate the inter-electrode gap amount between the wire electrode 12 and the work 14. Further, the pause time tp during which electrical discharge is not performed and/or the operation time tm of the main discharge circuit 18, are/is changed according to the estimation result of the inter-electrode gap amount, so that it is possible to set the appropriate pause time tp and/or the operation time tm of the main discharge circuit 18 depending on the inter-electrode gap amount. Consequently, it is possible to efficiently perform finishing and improve the precision of the finishing.

When the discharge delay time Td is less than the predetermined time Tth, the discharge control device 30 increases the operation time tm of the main discharge circuit 18 compared to a case where the discharge delay time Td is the predetermined time Tth or more.

According to the above configuration, when the discharge delay time Td is less than the predetermined time Tth, the discharge control device 30 determines the inter-electrode gap amount as a small (narrow) inter-electrode gap, increases the operation time tm of the main discharge circuit 18 and increases discharge energy. Thus, it is possible to efficiently perform finishing and improve the precision of the finishing.

The discharge control device 30 makes the operation time tm of the main discharge circuit 18 longer as the discharge delay time Td becomes shorter.

According to the above configuration, the inter-electrode gap amount becomes smaller (narrower) as the discharge delay time Td becomes shorter, and therefore the discharge control device 30 increases the operation time tm of the main discharge circuit 18 and increases discharge energy. Consequently, it is possible to efficiently perform the finishing and improve the precision of the finishing.

Essentially, the operation time tm of the main discharge circuit 18 can be set according to the duration of the discharge delay time Td. However, when the operation time tm of the main discharge circuit 18 is made too long, surface roughness might be degraded and excessive heat might be generated from a power element of the main discharge circuit 18. According to the above configuration, in contrast, the operation time tm of the main discharge circuit 18 does not go beyond a certain time, and therefore the phenomena such as deterioration of surface roughness and excessive heat generation of the power element do not occur.

When the discharge delay time Td is less than the predetermined time Tth, the discharge control device 30 decreases the pause time tp compared to a case where the discharge delay time Td is the predetermined time Tth or more.

According to the above configuration, when the discharge delay time Td is less than the predetermined time Tth, the discharge control device 30 determines the inter-electrode gap amount as a small (narrow) inter-electrode gap amount, decreases the pause time tp and increases the processing frequency. Thus, it is possible to efficiently perform the finishing and improve the precision of the finishing.

The discharge control device 30 makes the pause time tp shorter as the discharge delay time Td becomes shorter.

According to the above configuration, when the discharge delay time Td becomes shorter, the inter-electrode gap amount is smaller (narrower), and therefore the discharge control device 30 shortens the pause time tp and increases the processing frequency. Consequently, it is possible to efficiently perform the finishing and improve the precision of the finishing.

Essentially, it is possible to set the pause time tp according to the duration of the discharge delay time Td. However, when the pause time tp is made too long, the discharge frequency decreases and the processing speed becomes slow. According to the above configuration, the pause time tp does not go beyond a certain time, so that the discharge frequency does not become too low, and the processing speed does not become slow.

The embodiments have been described assuming that the wire electrical discharge machining device 10 is used for finishing. However, machining is performed by using power that is not likely to cause wire break or disconnection, the wire electrical discharge machining device 10 may be used for roughing.

The wire electrical discharge machining device 10 according to the present invention is not limited to the above embodiments, and can naturally employ various configurations without departing from the scope of the present invention.

What is claimed is:

1. A wire electrical discharge machining device, comprising:
    a discharge induction circuit configured to apply an induction voltage to an inter-electrode gap between an electrode and a work and configured to induce electrical discharge;
    a main discharge circuit configured to apply a machining voltage to the inter-electrode gap and allow a machining current to flow therein,
        wherein the wire electrical discharge machining device is configured to process the work by repeating a series of cycle including an operation and a pause of the discharge induction circuit and the main discharge circuit,
        the cycle comprising an operation of the discharge induction circuit, a subsequent operation of the main discharge circuit, and a next subsequent pause time during which the discharge induction circuit and the main discharge circuit are not operated;
    a first processor configured to output an application detection signal in response to an inter-electrode voltage exceeding a threshold, after a predetermined inter-electrode state determination period has passed since application of the induction voltage to the inter-electrode gap by the discharge induction circuit; and
    a second processor configured to change at least one of the pause time and an operation time of the main discharge circuit according to whether or not the first processor outputs the application detection signal,
    wherein, in response to the first processor not outputting the application detection signal after the inter-electrode state determination period has passed, the second processor is configured to decrease the pause time, compared to a case where the first processor outputs the application detection signal at a point of time at which the inter-electrode state determination period has ended.

2. The wire electrical discharge machining device according to claim 1, wherein, in response to the first processor not outputting the application detection signal after the inter-electrode state determination period has passed, the second processor is configured to increase the operation time of the main discharge circuit, compared to a case where the first processor outputs the application detection signal at a point of time at which the inter-electrode state determination period has passed.

3. The wire electrical discharge machining device according to claim 1, wherein the second processor is configured to change at least one of the pause time and the operation time of the main discharge circuit when finishing is performed.

4. A wire electrical discharge machining device, comprising:
    a discharge induction circuit configured to apply an induction voltage to an inter-electrode gap between an electrode and a work and configured to induce electrical discharge;
    a main discharge circuit configured to apply a machining voltage to the inter-electrode gap and allow a machining current to flow therein,
        wherein the wire electrical discharge machining device is configured to process the work by repeating a series of cycle including an operation and a pause of the discharge induction circuit and the main discharge circuit, the cycle comprising an operation of the discharge induction circuit, a subsequent operation of the main discharge circuit, and a next subsequent pause time during which the discharge induction circuit and the main discharge circuit are not operated;

a first processor configured to measure a discharge delay time from application of the induction voltage to the inter-electrode gap by the discharge induction circuit until occurrence of the electrical discharge; and a second processor configured to change at least one of the pause time and an operation time of the main discharge circuit according to the discharge delay time, wherein, in response to the discharge delay time being less than a predetermined value, the second processor is configured to decrease the pause time compared to a case where the discharge delay time is the predetermined value or more.

5. The wire electrical discharge machining device according to claim 4, wherein, in response to the discharge delay time being less than the predetermined value, the second processor is configured to increase the operation time of the main discharge circuit compared to a case where the discharge delay time is the predetermined value or more.

6. The wire electrical discharge machining device according to claim 4, wherein the second processor is configured to make the operation time of the main discharge circuit longer as the discharge delay time becomes shorter.

7. The wire electrical discharge machining device according to claim 4, wherein the second processor is configured to change at least one of the pause time and the operation time of the main discharge circuit when finishing is performed.

8. A wire electrical discharge machining device, comprising:

a discharge induction circuit configured to apply an induction voltage to an inter-electrode gap between an electrode and a work and configured to induce electrical discharge;

a main discharge circuit configured to apply a machining voltage to the inter-electrode gap and allow a machining current to flow therein, wherein the wire electrical discharge machining device is configured to process the work by repeating a series of cycle including an operation and a pause of the discharge induction circuit and the main discharge circuit, the cycle comprising an operation of the discharge induction circuit, a subsequent operation of the main discharge circuit, and a next subsequent pause time during which the discharge induction circuit and the main discharge circuit are not operated;

a first processor configured to measure a discharge delay time from application of the induction voltage to the inter-electrode gap by the discharge induction circuit until occurrence of the electrical discharge; and a second processor configured to change at least one of the pause time and an operation time of the main discharge circuit according to the discharge delay time, wherein the second processor is configured to make the pause time shorter as the discharge delay time becomes shorter.

9. The wire electrical discharge machining device according to claim 8, wherein, in response to the discharge delay time being less than a predetermined value, the second processor is configured to increase the operation time of the main discharge circuit compared to a case where the discharge delay time is the predetermined value or more.

10. The wire electrical discharge machining device according to claim 8, wherein the second processor is configured to make the operation time of the main discharge circuit longer as the discharge delay time becomes shorter.

11. The wire electrical discharge machining device according to claim 8, wherein the second processor is configured to change at least one of the pause time and the operation time of the main discharge circuit when finishing is performed.

* * * * *